Jan. 4, 1938.     J. GUTMANN     2,104,322
CONTAINER AND METHOD OF MAKING SAME
Filed July 17, 1936

Jesse Gutmann
INVENTOR
BY Frank O. Wentworth
his ATTORNEY.

Patented Jan. 4, 1938

2,104,322

UNITED STATES PATENT OFFICE 2,104,322

CONTAINER AND METHOD OF MAKING SAME

Jesse Gutmann, Babylon, N. Y., assignor to Ferdinand Gutmann & Co., Brooklyn, N. Y., a corporation of New York Application July 17, 1936, Serial No. 91,140

5 Claims. (Cl. 221—60)

The invention relates to containers and method of making same, and more particularly to collapsible tube containers and to the method of manufacturing such containers.

Collapsible tube containers have long been extensively used and many different methods and machines have been used in the production of such containers. So far as the present invention is concerned, any of these well known procedures and machines may be employed in producing the body of the container.

At the present time, two methods are extensively followed and the present invention consists in a modification of these two methods in respects to be more particularly pointed out hereinafter.

The first of these well known methods consists in forming the body of the container by means of molds and extruding apparatus which, by a continuing operation, produce a tubular container open at the bottom and contracted at the top, the top having a central discharge port formed by an exteriorly screw threaded nozzle. After the formation of a container in the manner above referred to, a decoration may be impressed upon the exterior of the tube while the container is upon a mandril and a closure cap is applied to the screw threaded nozzle before the container is mounted on the mandril. After the printing operation, the container is passed through an oven or a heated zone to rapidly dry the ink of the decoration.

By the second procedure above referred to, the cap is applied immediately before the packaging of the container following the decorating of the tube and drying of the ink in an oven.

During the formation of the container body, the metal is at an elevated temperature, but during subsequent operations, including the application of the cap, the container is cold. The cap used is generally made by molding a plastic composition, phenol-aldehyde compounds being extensively used in the production of such caps. Hence, the tubular container and the caps are of materials having different coefficients of expansion, and the nozzle is highly expanded after the cap is applied thereto, and the cap itself is cold when it is so applied by an ordinary cap applying mechanism.

Containers of the type to which the invention relates are delivered to the users thereof with the body portion still in true cylindrical form throughout, said body portion being subsequently filled with paste or other material before the extreme bottom of the tube is collapsed and folded upon itself to seal the container. While filling such tubes, the closure cap is in position upon the nozzle so as to confine the paste or other material within the tube during the filling operation.

In all instances, the manufacturer of the tube applies the closure cap to the discharge nozzle before delivery of the container to the user thereof.

One of the serious difficulties in the production of such containers and their use has been that with shrinkage of the metal of the nozzle and in the handling and transportation of such containers, there is a tendency of the caps to become loosened, so that it has been found necessary for the user, before filling a container, to test the security of each cap before delivering the paste or other material to within the tubular body of the container. In fact, some manufacturers, before shipping the containers in boxes, test every cap upon every container. These frequent inspections and tests of the containers involve considerable expense in an article which must be produced at a very low cost, and tubes quite frequently collapse during such inspection and handling so as to cause material loss of such containers.

Loosened caps interfere with the packaging operation and materially increase the cost of this operation, aside from the other expenses and losses above referred to.

With the above conditions in mind, I have devised a container of the type herein referred to, wherein irrespective of the tightness or looseness of the closure cap, the discharge nozzle will be effectively sealed prior to the delivery of the finished containers, so that frequent inspections and tests of the caps of such containers is unnecessary, and the possibility of loss from an improper packaging of the pastes or other materials is avoided.

A container embodying the invention may be formed by means of the same machines, and by the same practices as are now commonly in vogue, and at an advanced cost so small as to involve no additional expense in view of the elimination of losses due to containers which are in imperfect condition upon delivery to the packer.

A container embodying the invention involves no additional operations in the assembly of the parts of the containers, and the inner seal member used in conjunction with the cap for effectively sealing the discharge nozzle, is so formed or deformed during the application of the cap to the nozzle as to facilitate the removal of the inner seal member when it is desired to remove any part of the material packed in the container.

When a container embodying, and made in accordance with, the invention is completed and ready for shipment to a user of such collapsible tubes, the inner seal member not only extends across and closes the nozzle opening, but forms a gas and liquid tight joint about the top of the nozzle which is not affected by normal temperature variations, nor by expansion or contraction of the material of the nozzle with ordinary conditions of use.

The preferred method of making containers in accordance with the invention involves the utilization of the heat necessarily present in the finishing of the body of the container to form the inner seal while the material of the body is expanded and during the subsequent cooling of the material, whether such heat is used to dry the ink of the decoration upon said body or for merely forming the seal.

The invention consists primarily in a container embodying therein a collapsible tubular metallic body having an uncontracted open bottom, a contracted top and a delivery nozzle extending from said top, an inner seal of flexible and rupturable material extending across said nozzle and bonded about the top thereof by a heat fusible adhesive forming with said inner seal material a gas and liquid tight joint, and a closure cap removably mounted upon said nozzle and engaging said inner seal material; and in such other characteristics, and in the novel steps and practices in making same, all as hereinafter set forth and described, and more particularly pointed out in the claims hereto appended.

Referring to the drawing.

Like numerals refer to like parts throughout the several views.

Figure 1:
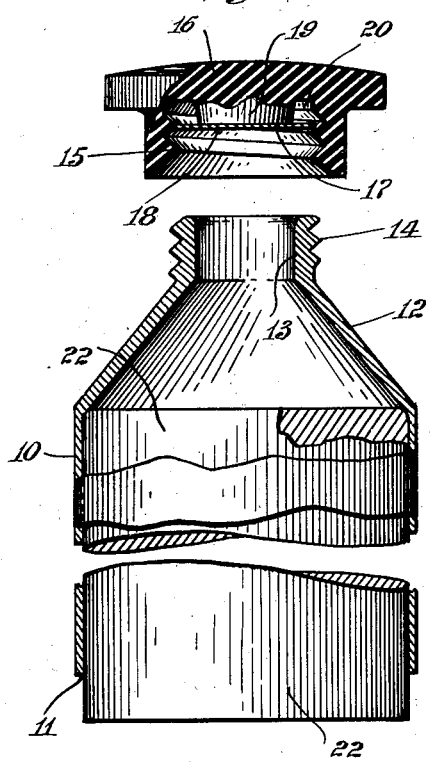
Fig. 1 is a view partly in section showing the first step in the closing of a container during the process of manufacturing same.

A container embodying the invention, as shown in the accompanying drawing which is upon a greatly enlarged scale, consists of a body 10 of a ductile metal having an uncontracted open bottom 11 and a contracted top 12 converging towards a delivery nozzle 13 by means of which a closure is connected with the body. In the form of container shown in the drawing, the nozzle 13 has exterior screw threads 14 adapted to be engaged by complementary screw threads 15 within the skirt of a closure cap 16 of well known construction.

The manner of attaching the closure cap 16 to the nozzle 13 is, however, immaterial to the invention since the sealing of the nozzle prior to the filling of the tubular body 10 is secured by means other than said cap.

In a container embodying the invention, the closing of the nozzle 13 is by means of a disc 17 extending across said nozzle and bonded about the top thereof by means of a suitable adhesive or cement. This inner sealing disc 17 is composed of flexible and rupturable material, this material being used for the purpose of facilitating the application of the disc to the nozzle when finishing the container preparatory to shipment, as well as to facilitate its removal when it is desired to use the contents of the container.

A collapsible container, unlike other forms of containers, is not susceptible of being refilled. The merchandise distributed in such containers ordinarily is not of a character which would make refilling of the container profitable. The main object of this inner seal is to provide an effective closure of the nozzle of the container when it is desired to ship same to the user, so that during the filling of the container the escape or seepage of the material between the nozzle and the closure cap is prevented. Such seepage is highly objectionable, since it may not only interfere with the removal of the closure, but makes the merchandise unsightly when the closure cap is removed.

The bond between the disc 17 to prevent such escape or seepage of the contents while filling must be gas and liquid tight.

In actual practice, I have used a disc made of a cellulose material, such as cellulose acetate, although thin metal or treated paper discs will serve the same purpose.

The entire under face of the disc is coated with a stratum 18 of a suitable heat fusible adhesive to facilitate the final assembly of the container. I have found a cellulose derivative adhesive to be suitable for this purpose, since it has a melting point sufficiently high to prevent softening of the adhesive at ordinary temperatures.

The container proper may be made of various metals and their alloys which are or may be made sufficiently ductile to permit the formation of the tube by the usual manufacturing methods.

The closure cap 16 preferably consists of a molded plastic containing phenol-aldehyde, commonly known by the trade name of Bakelite, although the material of this cap is immaterial to the invention.

Centrally of the cap is a stopper member 19 having tapered side walls, and surrounded by a channel 20 between it and the skirt of the cap. This stopper is adapted to enter the opening of the nozzle and, in containers made prior to my invention, was relied upon to close the nozzle. In a container embodying the invention, I utilize this stopper in making the bond between the inner sealing disc 17 and the nozzle and to cup the disc 17 inwardly and so deform it as to provide a projecting edge of the disc to facilitate its removal when first opening a container. The cupped portion of the disc 17 is bonded within the opening by the adhesive so that, notwithstanding the flared or projecting edge of the disc, an uninterrupted bond is present between the disc and the nozzle, which bond is both gas and liquid tight, such characteristics also being inherent to the disc itself.

Figure 2:
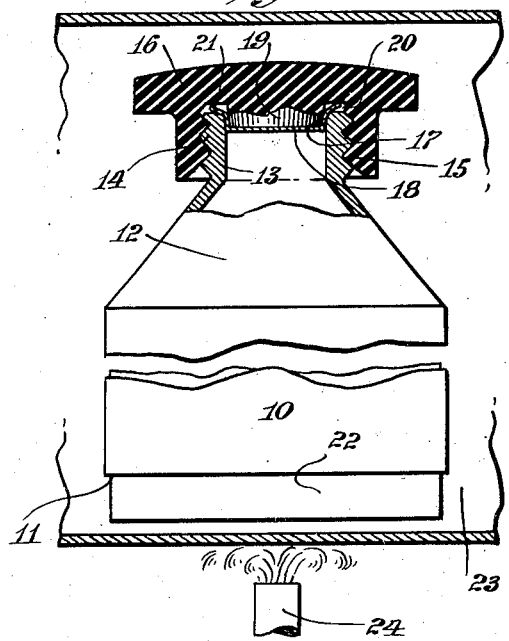
Fig. 2 is a similar view showing a succeeding step.
Figure 3:
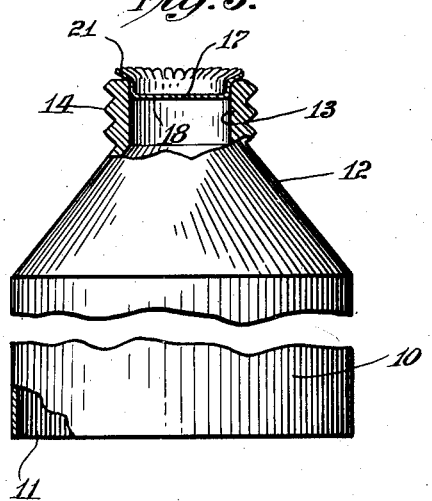
Fig. 3 is a similar view of a completed container with the closure cap removed.
Figure 4:
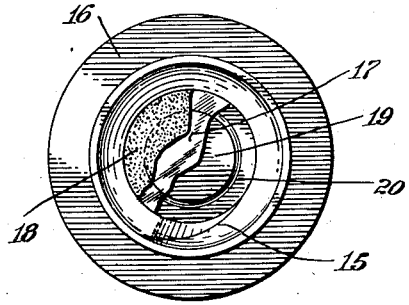
Fig. 4 is a bottom plan view, broken away on different planes, of a closure cap before application to the container body.

The projecting edge is indicated at 21 in Figs. 2 and 3 of the drawing, the channel 20 affording space permitting the forming of the edge 21 in the manner shown. The inner seal disc 17 and its adhesive stratum 18 may have a thickness of from .003 to .005 of an inch, and since, with the use of this inner seal disc, it is immaterial whether the cap 16 is secured tightly to the nozzle, there may be wide variation as to the thickness of this disc so long as sufficient clearance is afforded between the smallest diameter of the stopper and the inner side wall of the nozzle.

Metal when cooling, shrinks upon itself, and one difficulty with containers of the type to which the invention relates, prior to my invention, was that the metal was heated after the closure was applied to the nozzle, so that shrinkage of the metal of the nozzle resulted, in many cases, in looseness of the cap.

With an inner seal disc of the character herein referred to, expansion or contraction of the material of the container is immaterial, since the inner seal disc will yield to accommodate itself to slight variations in the dimensions of the nozzle, although such slight variations would be sufficient to cause looseness between the nozzle and the cap.

A heat fusible adhesive is employed upon the under face of the disc 17 because of the impracticability of applying cold adhesives to the top of the nozzle during the assembling of the container, and also to take advantage of the heat of the metal itself in forming an effective seal between the disc and the top of the nozzle.

I have devised a method by which containers embodying the invention may be produced, not only in a manner to ensure the effective sealing of the discharge nozzle of all such containers, but without any substantial increase in the cost of producing the containers beyond that of the inner seal disc itself.

In the practice of this method, the container itself is pre-formed in any well known or desired manner, and may have decorations impressed thereon, all by the practice of the usual procedure and by the usual machines. In the production of such containers, the body, the decoration and a pre-formed cap are formed and assembled by succeeding operations, heat being applied to dry or oxidize the ink, as one stage in this procedure.

By other methods, the body is formed in one machine and this body is decorated and the pre-formed cap applied thereto in a different machine or by hand. In both methods, however, heat is applied to the material of the body, and in the method of my invention, I utilize this heat in forming the bond between the inner sealing disc 17 and the container nozzle 13. This procedure is preferable although it is obvious that the heat utilized for bonding the inner seal disc to the nozzle may be developed exclusively for the purpose of forming the bond. Whatever the conditions may be, the fusing of the adhesive bonding the inner seal disc to the nozzle results from the conduction of heat to the adhesive by the metal of the container body and nozzle.

In the practice of the method, I mount upon the nozzle 13 of a pre-formed container, a closure cap 16 carrying within same a disc 17 with the adhesive coated surface 18 presented outwardly of the skirt of the cap. When a screw cap is used, it is placed upon the nozzle by means of an ordinary capping mechanism. After the inner seal disc 17 engages the top of the nozzle, the stopper member 19 forces the central portion of this disc within the opening of the nozzle and against the side wall of the nozzle opening, causing the edge portion of the disc to flare upwardly within the channel 20 about said stopper member. The cupping of the disc results in the crinkling or crimping of the edge and a flaring thereof upwardly of the nozzle to within the channel.

Preferably, the cap is applied to the nozzle while the metal thereof is at a normal temperature, following the forming of the container or before subjecting the container to heat to dry or oxidize the ink of the decoration thereon. If desired, however, the cap may be applied thereto before packing for shipment, and may be brought to the desired elevated temperature thereafter. Whatever the method of heating the container, this heat is conducted through the material of the container to the adhesive stratum 18 so as to soften the adhesive and make it sufficiently tacky to adhere to the metal of the container and form a strong bond upon the subsequent cooling of the container and the adhesive. Irrespective of the time and manner of heating the container, the inner seal disc will always be in close intimate contact with the nozzle, so that an effective continuous bond is secured which is both gas and liquid tight.

By forcing the disc within the opening of the nozzle, a greater area of contact between the disc and the nozzle is secured. By reason of the channel 20, the pressure is limited to the inner edge of the nozzle opening and the space immediately below same, no pressure being applied against the inner seal disc at the top about the mouth of the nozzle, in the form of the invention shown. If desired, however, the stopper 19 may be dispensed with and a perfectly flat or a slightly inwardly dished inner top surface may be provided in the cap, so as to extend the area of contact between the disc and the nozzle to the top thereof.

It is immaterial to the method of the invention whether the cap becomes loosened or not in the subsequent handling of the containers, since escape of the contents of the container is prevented by the interposition of the inner seal disc between the container and the cap.

Ordinarily, when placing a cap upon a container, the container is supported upon a mandril preventing collapsing of the container. Such a mandril is shown at 22 in the drawing. In Fig. 1 I have shown the container so mounted on the mandril and the closure cap with the inner sealing disc therein in position to be applied to the nozzle. In Fig. 2 I have shown the container still on the mandril being passed through an oven shown conventionally at 23, which oven is maintained at the desired temperature in any desired manner, as by a burner shown at 24.

In the manner above described, I am enabled to produce a container in which the nozzle is closed and sealed by an inner seal disc applied thereto as a part of the manufacturing procedure in producing the container, the completely assembled article being delivered to the user with the cap thereon.

By producing caps in the manner herein described and having the above characteristics, repeated inspection and testing to determine whether or not the container is properly sealed is avoided, as is also the losses due to the damaging of the containers resulting from such inspection and testing.

After a container has been filled, the ultimate user of its contents merely removes the cap 16, and by grasping the upwardly projecting edge of the inner seal disc, removes it from the nozzle so as to permit the free flow of the contents of the tube through the nozzle when the body is collapsed.

In the packaging of pastes, the contents of the container may or may not contact with the inner sealing disc, but this inner sealing disc is desirable in preventing escape of the contents of a container during transportation. Hence, the disc 17 remains upon the nozzle so that it must be removed by the ultimate user of the contents of the container.

It is not my intention to limit the invention, so far as the container structure is concerned, to the exact characteristics herein described, it being obvious that such may be varied without departing from the spirit and scope of the invention.

While the method contemplates the application of the inner seal disc and cap to the nozzle of the collapsible tubular container and the melting of the adhesive upon the inner seal disc by heat derived from the material of the container, such heating of the container may be done prior to or following the application of the cap thereto, so that the material is at or brought to a temperature sufficiently high to fuse or melt the adhesive stratum 18.

Having described the invention, what I claim as new and desire to have protected by Letters Patent, is:—

1. A container embodying therein a collapsible tubular metallic body having an uncontracted open bottom, a contracted top and a delivery nozzle extending from said top, an inner seal of flexible and rupturable material extending across said nozzle and bonded about the top thereof by a heat fusible adhesive forming with said inner seal material a gas and liquid tight joint, and a closure cap removably mounted upon said nozzle and engaging said inner seal material.

2. A container embodying therein a collapsible tubular metallic body having an uncontracted open bottom, a contracted top and a delivery nozzle extending from said top, an inner seal of flexible and rupturable material extending across and cupped downwardly within said nozzle and engaging the inner wall thereof, the portions of said seal engaging said nozzle being bonded about the top thereof by a heat fusible adhesive forming with said inner seal material a gas and liquid tight joint, and a closure cap removably mounted upon said nozzle having a stopper entering said nozzle and engaging said inner seal material.

3. A container embodying therein a collapsible tubular metallic body having an uncontracted open bottom, a contracted top and a delivery nozzle extending from said top, an inner seal of flexible and rupturable material extending across and cupped downwardly within said nozzle and engaging the inner wall thereof, the portions of said seal engaging said nozzle being bonded about the top thereof by a heat fusible adhesive forming with said inner seal material a gas and liquid tight joint, the edge of said inner seal being flared upwardly away from the top of said nozzle, and a closure cap removably mounted upon said nozzle having a stopper entering said nozzle and engaging said inner seal material, said cap having a channel about said stopper for the reception of said upwardly flared edge of said seal.

4. A container embodying therein a collapsible tubular metallic body having an uncontracted open bottom, a contracted top and a delivery nozzle extending from said top, an inner seal of flexible and rupturable material having a heat fusible adhesive coated upon the downwardly presented face thereof extending across said nozzle and bonded about the top thereof by said heat fusible adhesive forming with said inner seal material a gas and liquid tight joint, and a closure cap removably mounted upon said nozzle and engaging said inner seal material.

5. A container embodying therein a collapsible tubular metallic body having an uncontracted open bottom, a contracted top and a delivery nozzle extending from said top, an inner seal of flexible and rupturable material having a heat fusible adhesive coated upon the downwardly presented face thereof extending across and cupped downwardly within said nozzle and engaging the inner wall thereof, the portions of said seal engaging said nozzle being bonded about the top thereof by said heat fusible adhesive forming with said inner seal material a gas and liquid tight joint, the edge of said inner seal being flared upwardly away from the top of said nozzle, and a closure cap removably mounted upon said nozzle having a stopper entering said nozzle and engaging said inner seal material, said cap having a channel about said stopper for the reception of said upwardly flared edge of said seal.

JESSE GUTMANN.